USOO5399664A

United States Patent [19]

Peng et al.

[11] Patent Number: 5,399,664
[45] Date of Patent: Mar. 21, 1995

[54] SECOND ORDER NONLINEAR OPTICAL POLYIMIDE POLYMER WITH HIGH TEMPERATURE STABILITY

[75] Inventors: Zhonghua Peng; Luping Yu, both of Chicago, Ill.

[73] Assignee: Arch Development Corporation, Chicago, Ill.

[21] Appl. No.: 151,072

[22] Filed: Nov. 10, 1993

[51] Int. Cl.[6] .................. C08G 69/26; C08G 73/10
[52] U.S. Cl. ...................... 528/353; 528/125; 528/128; 528/172; 528/173; 528/176; 528/220; 528/229; 528/350; 522/162; 522/164; 526/258; 526/265
[58] Field of Search ............... 528/353, 125, 128, 172, 528/173, 176, 220, 229, 350; 522/162, 164; 526/265, 258

[56] References Cited

U.S. PATENT DOCUMENTS

| | | | |
|---|---|---|---|
| 4,605,869 | 8/1986 | Choe | 307/425 |
| 4,659,177 | 4/1987 | Choe et al. | 350/96.34 |
| 4,779,961 | 10/1989 | De Martino | 526/258 |
| 4,801,670 | 9/1198 | De Martino | 526/265 |
| 4,808,332 | 2/1989 | De Martino et al. | 526/312 |
| 4,865,430 | 9/1989 | De Martino | 526/312 |
| 4,886,339 | 12/1989 | Scozzafava et al. | 350/96.34 |
| 4,913,844 | 4/1990 | De Martino | 526/265 |

FOREIGN PATENT DOCUMENTS 1196026  8/1989  Japan.
 580277  4/1993  Japan.

OTHER PUBLICATIONS

Chemistry of Materials 4(6), Nov./Dec. 1992, pp. 1148–1150, Jiann T. Lin et al, "Poled Polymeric Nonlinear Optical Materials Exceptional Second Harmonic Generation Temporal Stability of a Chromophore-Functionalized Polyimide".
CA118(20):192639q, May 17, 1993.
CA119(18):181519v, Nov. 1, 1993.

Primary Examiner—John Kight, III
Assistant Examiner—P. Hampton-Hightower
Attorney, Agent, or Firm—Arnold, White & Durkee

[57] ABSTRACT

The invention relates generally to polymers exhibiting second order nonlinear optical properties, and characterized by high thermal stability. Disclosed are polymers prepared by a polycondensation reaction between an aromatic dianhydride and a compound selected from the group consisting of a di(alkylamino)amine and an aromatic diamine. Most preferred are polymers that are the products of a polycondensation reaction between 1,2,4,5-benzenetetracarboxylic dianhydride and nitro(N,N-diethylamino)stilbene, wherein the polymer is imidized by further heat treatment.

7 Claims, 11 Drawing Sheets

SECOND ORDER NONLINEAR OPTICAL POLYIMIDE POLYMER WITH HIGH TEMPERATURE STABILITY

The U.S. Government may own rights in the present invention pursuant to ONR Grant No. N000493-1-0092.

FIELD OF THE INVENTION

This invention relates generally to polymers exhibiting second order nonlinear optical properties, and characterized by high thermal stability.

BACKGROUND OF THE INVENTION

Information is more rapidly processed and transmitted using optical as opposed to electrical signals. There exists a need for finding nonlinear optical materials which alter the transmission of optical signals or serve to couple optical devices to electrical devices, i.e., electro-optic devices.

Second order nonlinear optical (NLO) polymers are expected to find extensive uses in opto-electronic applications. NLO polymers have several advantages over single crystalline inorganic and organic molecular systems. These include easy preparation, adjustable refractive indices and controlled arrangement of spatial order. For second order applications, it is imperative that the material be noncentrosymmetric. In noncentrosymmetric organizations, several organic molecular and polymeric systems have been characterized by large second order NLO coefficients, ultra-fast response times, performance over a broad wavelength range and high laser damage threshold compared to the traditional inorganic materials, e.g., lithium niobate ($LiNbO_3$) or potassium dihydrogenphosphate ($KH_2PO_4$). Background information relating to the principles of nonlinear optical polymers, can be found in *Nonlinear Optical and Electroactive Polymers*, edited by Prasad and Ulrich, Plenum Press (1988).

A number of applications, such as second harmonic generation (SHG), frequency mixing, electro-optic modulation, optical parametric emission, amplification and oscillation have been proposed for organic and polymeric materials with large second order NLO coefficients. A number of approaches have been made in the past decade to organize NLO molecules in a polymer matrix in a noncentrosymmetric manner. The most important, but not the only aspect from the standpoint of application, is the organization of NLO molecules into preferred orientation and their stability in the aligned state up to at least cold wire bond temperatures (about 100° C.).

Historically, one of the first approaches to this alignment of NLO molecules in a polymeric system came with the concept of the guest-host system. (Singer, 1986). The NLO molecules may be incorporated by a solution casting method with an amorphous polymer and the second order non-linearity may be imparted by subsequent poling of the NLO molecules in the matrix using an external electric field, e.g., corona poling, parallel plate poling or integrated electrode poling. Advantages of this approach are ease of processing, tailorable refractive indices, control of spatial ordering of the polymer, and choice of a wide range of materials. However, the decay (both the initial and long term) of second order properties as confirmed through SHG from the matrix is unavoidable when the poling field is withdrawn from the matrix. Moreover, a high degree of loading of the NLO molecules in the polymer is not possible because of phase segregation of the matrix or blooming of NLO molecules in the matrix, both resulting in optical scattering.

Electro-optic waveguide devices form an essential component of the emerging field of integrated optics. Electro-optics is a property whereby materials change their refractive index upon the application of an electric field. This change in refractive index affects the way the material interacts with light. Electro-optics and electro-optic waveguide devices are described, for example, by Nishihara (1985), and by Hunsperger (1985).

Electro-optic waveguide devices can be passive waveguide devices or functional waveguide devices. Some passive waveguides are optical beam-dividers, polarizers, and the like. Some functional waveguides are phase modulators, Mach-Zehnder modulators, and the like. Generally, electro-optic waveguides, or optical waveguides in short, consist of a transparent waveguiding core ("guiding layer") surrounded by a layer of transparent materials ("cladding layer"). Among these layers, the guiding layer serves the important function of interacting with and affecting the propagation of light. Materials that form the guiding layer have been traditionally inorganic materials such as lithium niobate, potassium dihydrogen phosphate, ammonium dihydrogen phosphate, and the like. These are typically single crystal materials, and lack processing capabilities. In recent years, NLO polymeric materials have seen increased application as guiding layers. Generally, polymeric NLO materials can or may have the specific advantages mentioned above of fast response time, small dielectric constant, good linear optical properties, large nonlinear optical susceptibilities, high damage threshold, engineering capabilities, and ease of fabrication.

There are various known polymeric organic materials which possess specific nonlinear optical properties and various known processes for making such polymeric organic materials. Many of the current polymeric organic materials prepared by the prior art are prepared by blending a NLO molecule into a polymer host material. "Blending" herein means a combination or mixture of materials without significant reaction between specific components.

As mentioned above, a problem associated with a "guest-host" polymer with NLO properties produced by simply blending of NLO molecules into a host polymer is that these polymer materials lack stability of orientation. Generally, the incorporation of molecular structures which have NLO activity into the backbone of a polymer chain will decrease the likelihood of the structural reorganization in comparison with polymers in which the NLO active molecule is simply blended. It is therefore desirable to provide a polymer material with NLO groups covalently bonded to the backbone of the polymer material to minimize relaxation effects.

There is a continuing effort to develop new nonlinear optical polymers with increased nonlinear optical susceptibilities and enhanced stability of nonlinear optical effects. Generally, nonlinear optical polymers contain nonlinear optical moieties as covalently linked part of polymer chains. Examples of such polymers are described in Williams, ed. (1983). The nonlinear optical moiety may be part of the polymer backbone, or it may be appended to the polymer backbone through intervening spacer groups. The latter are referred to as side chain nonlinear optical polymers. EP 89402476.9, for example, discloses nonlinear optical polymers where the nonlinear optical moiety forms part of the polymer backbone. U.S. Pat. Nos. 4,779,961; 4,801,670; 4,808,332; 4,865,430 and 4,913,844, the teachings of which are herein incorporated by reference, disclose several side-chain nonlinear optical polymers.

Nonlinearity of moieties is described in terms of second order nonlinearity, third order nonlinearity, and so on, with the corresponding unit values being referred to as second order nonlinear optical susceptibility, third order nonlinear optical susceptibility, and so on. Nonlinear optical moieties of polymers that are preferred as guiding layers in optical waveguide devices generally must possess acceptable second order nonlinear activity. These moieties are generally made up of conjugated pi-electron systems with an electron donating group such as an amine group, and an electron-acceptor group such as a nitro group forming either end of the conjugated pi-electron system.

Nonlinear optical polymers can be cast as films on substrates by processes such as spin coating from a solution of the polymer in a solvent, spraying, Langmuir-Blodgett deposition, and the like. The substrate materials employed for electro-optic waveguide devices are generally inorganics such as silicon, GaAs, GaAlAs and the like. Silicon is particularly preferred as substrate material due to its ready availability in wafer form in a well-purified state, and the highly-developed state of its technology in integrated circuit and electronics industries. Wafers from silicon also have the advantage that they can be easily cleaved into minute chips carrying the individual devices.

Although second order nonlinear optical (NLO) polymers hold promise for practical applications in electro-optical devices, a number of issues remain have to be addressed before they can see wider commercial application. (Prasad, 1991; Marder, 1991; Chemla, 1987; Williams, 1984.) Three of these crucial issues are the high temporal stability of dipole orientation, large optical nonlinearity and minimum optical loss. Due to a realization of the intrinsic nature of the optical loss (due to C-H overtone vibration absorption), major research efforts have been focused on optimizing the optical nonlinearity and stabilizing the dipole orientation.

Different approaches have been taken to address these issues, and considerable progress has been achieved. For example, various cross-linking schemes (photochemical and thermal cross-linking) have been developed to lock the dipole orientation in the polymer matrix after electric poling. Temporal stabilities of second order NLO activity thus have been enhanced. The rationale behind the design of these polymers is that after cross-linking, the motion of the free volume in the polymer matrix can be frozen. This is reflected in the increase in glass transition temperatures of the resulting materials. The same notion leads to the concept that as long as a polymer has a high glass transition temperature, the induced dipole orientation can be stabilized in a certain temperature range. This was clearly demonstrated in second order NLO polyimide composite materials.

Wu et al. (1991) have found that polyimide composite materials prepared by electric poling and thermal curing from polyamic acid doped with an Eriochrome black T dye exhibited long term NLO stability at high temperature. More recently, Marks et al.(1992) and Dalton et al. (1993) developed a different approach to synthesizing polyimide second order NLO materials, realizing significant enhancement in stability due to high glass transition temperatures. The present invention represents a new nonlinear optical chromophore which allows the synthesis of a new polyamic acid (see Scheme I, FIG. 1). This polyamic acid can be easily cast into optical quality films and be imidized by thermally curing to generate polyimide with a high glass transition temperature. Very large and exceptionally stable second harmonic generation (SHG) coefficients were observed.

SUMMARY OF THE INVENTION

In one embodiment, the present invention provides a polymer exhibiting second order, nonlinear optical properties, further characterized by high-temperature stability, wherein the polymer is prepared by a polycondensation reaction between an aromatic dianhydride and a compound selected from the group consisting of a di(alkylamino)amine and an aromatic diamine. Preferably, the polymer of the present invention retains high-temperature stability at temperatures in the range of 150° to 180° C. More preferably, the high temperature stability of the polymer is indicated by retention of at least 70% of a second harmonic generation signal.

In an alternative embodiment, the polymer of the present invention, exhibiting second order, nonlinear optical properties, and characterized by high-temperature stability, is prepared by a polycondensation reaction between 1,2,4,5-benzenetetracarboxylic dianhydride and a compound selected from the group consisting of a di(alkylamino)amine and an aromatic diamine. Preferably, the polymer of the present invention is prepared by a polycondensation reaction between an aromatic dianhydride and nitro(N,N-diethylamino)stilbene. Most preferably, the polymer is a product of a polycondensation reaction between 1,2,4,5-benzenetetracarboxylic dianhydride and nitro(N,N-diethylamino)-stilbene.

In yet another embodiment, the polymer of the present invention is heated under conditions sufficient to form a polyimide polymer.

BRIEF DESCRIPTION OF THE DRAWINGS

FIG. 3: $^1$H NMR Spectra of the chromophore (FIG. 3A) and the NLO polyimide polymer (FIG. 3B) of the present invention.

FIG. 4: FTIR spectra of the polyamic acid (FIG. 4A) and the polyimide polymer (FIG. 4B) of the present invention.

FIG. 5: UV/Vis spectra of the polymers (FIG. 5A represents before and after the imidization and FIG. 5B represents before and after poling) of the present invention.

FIG. 6: DSC (FIG. 6A) and TGA (FIG. 6B) traces of the polymer of the present invention.

DETAILED DESCRIPTION OF THE INVENTION

The present invention relates generally to polymers exhibiting second order nonlinear optical properties, and characterized by high thermal stability. In one embodiment, the present invention provides a polymer exhibiting second order, nonlinear optical properties, further characterized by high-temperature stability, wherein the polymer is prepared by a polycondensation reaction between an aromatic dianhydride and a compound selected from the group consisting of a di(alkylamino)amine and an aromatic diamine.

In an alternative embodiment, the polymer of the present invention, exhibiting second order, nonlinear optical properties, and characterized by high-temperature stability, is prepared by a polycondensation reaction between 1,2,4,5-benzenetetracarboxylic dianhydride and a compound selected from the group consisting of a di(alkylamino)amine and an aromatic diamine. Preferably, the polymer of the present invention is prepared by a polycondensation reaction between an aromatic dianhydride and nitro(N,N-diethylamino)stilbene. Most preferably, the polymer is a product of a polycondensation reaction between 1,2,4,5-benzenetetracarboxylic dianhydride and nitro(N,N-diethylamino)stilbene. The polymer of the present invention can then heated under conditions sufficient to form a polyimide polymer.

Generally, in preparing NLO materials with second order susceptibility, the NLO functionalities in the polymer must have a net alignment for the polymer to exhibit NLO properties. Typically in the art, an electric field is applied to orient the moieties in the polymer for nonlinear optical effect. This type of orientation is referred to as electric field poling, parallel plate poling, or poling. Other conventional methods for the orientation of the NLO moieties can be carried out by corona poling or through stretching the polymer.

In electric field poling, the polymeric material is raised above its glass transition temperature, $T_g$, because in this state, large molecular motion is enhanced, and the nonlinear optic moieties can give a net orientation. However, orientation of the polymer has been observed to occur below the $T_g$. An intense electric field is then applied to the polymeric composition to align the nonlinear optic moieties. Electric field strengths of between about 0.05 to about 1.5 megavolts per centimeter (MV/cm) can be applied. The film is then cooled to room temperature with the electric field still applied. The field is then removed, resulting in a system where the nonlinear optic moieties are aligned within the polymer matrix.

Figure 1:
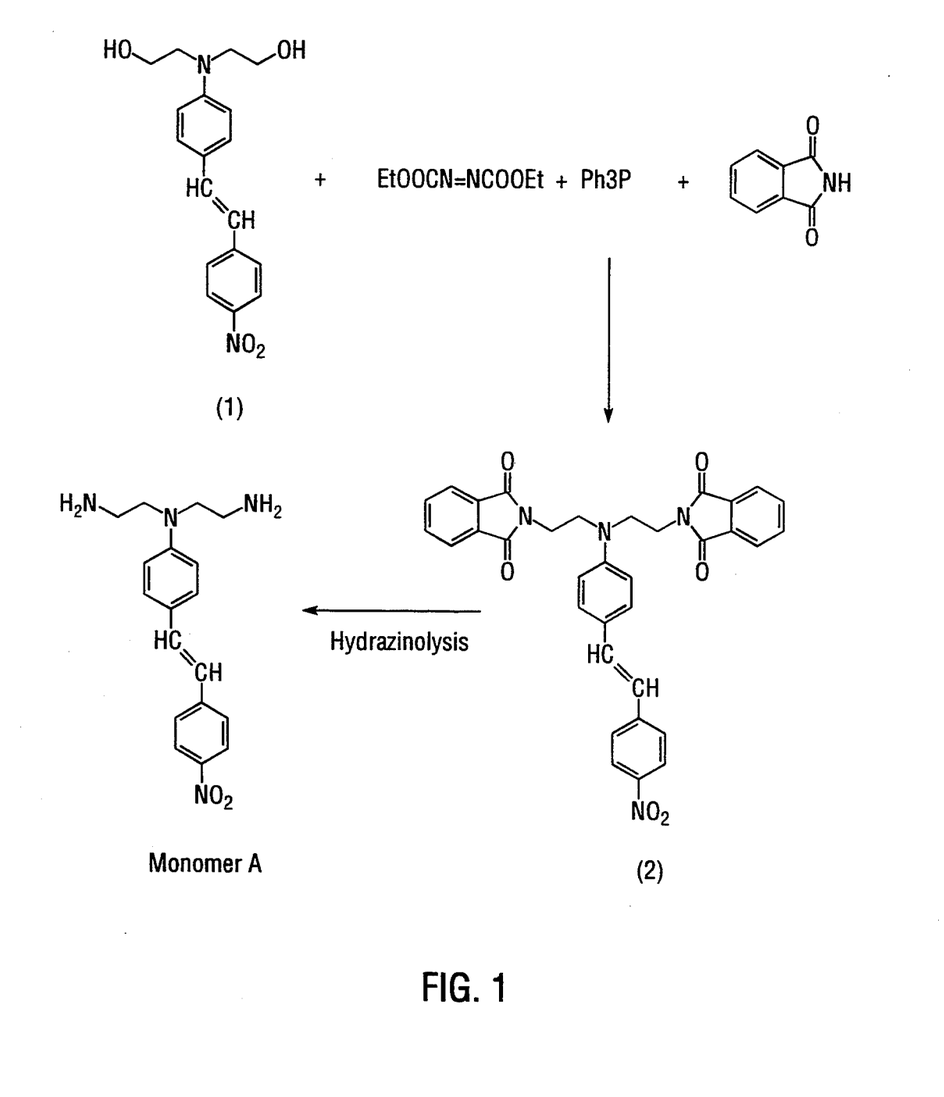
FIG. 1: Reaction scheme for the synthesis of the chromophore of the present invention.

According to the present invention, the reaction scheme of FIG. 1 provides a reaction approach that is versatile in synthesizing different materials. Several structural parameters can be varied to obtain new materials. For example, the NLO chromophore can be changed from the stilbene to other structures which will lead to improved NLO activity. Preferably, these other structures will have, like the stilbene moiety, either an alkyl or aryl conjugated system, with the presence of both pi-electron donating groups such as amino, and pi-electron withdrawing groups, such as nitro and cyano. Different phenyl and substituted phenyl dianhydride monomers can also be utilized to synthesize polyimides so that the high temperature stability can be further enhanced. Furthermore, the aliphatic diamine unit can be changed to aromatic diamine to produce a functionalized aromatic NLO polyimide. Due to the excellent processing ability of the resulting polyamic acids, it is possible to fabricate a variety of device elements. This, of course, is recognized by those of skill in the appropriate art.

EXAMPLES

Examples have been included to illustrate preferred modes of the invention. Certain aspects of the following examples are described in terms of techniques and procedures found or contemplated by the present inventors to work well in the practice of the invention. These examples are exemplified through the use of standard laboratory practices of the inventors. In light of the present disclosure and file general level of skill in the art, those of skill will appreciate that the following examples are intended to be exemplary only and that numerous changes, modifications and alterations can be employed without departing from the spirit and scope of the invention.

EXAMPLE 1

Preparation of Chromophore

Tetrahydrofuran (THF) was purified by distillation over sodium chips and benzophenone. N,N-dimethylformamide (DMF) was purified by distillation over phosphorous pentoxide. 1,2,4,5-benzenetetracarboxylic dianhydride (Monomer B) was purified by recrystalization from acetic anhydride and dried under vacuum at 150° C. overnight before use. All of the other chemicals were purchased from Aldrich Chemical Company and used as received unless otherwise stated.

Diethylazodi-carboxylate (DEAD) (2.389 g, 13.7 mmol) in THF (6 mL) was added drop-wise into a solution of compound 1 of FIG. 1 (1.5 g, 4.57 mmol), triphenylphosphine (3.598 g, 13.7 mmol) and phthalimide (2.018 g, 13.7 mmol) in THF (20 mL). The resulting mixture was stirred overnight and then filtered. The red solid collected was recrystallized from chloroform/hexane to yield compound 2 of FIG. 1, (1.52 g, 56.7%).

The key step in the preparation of the NLO polymer of the present invention is the synthesis of a new NLO chromophore bearing two aliphatic diamino groups. As shown in scheme 1 of FIG. 1, the amino groups were introduced into two arms of the chromophore utilizing the Mitsunobu reaction from the corresponding dihydroxyl chromophore, compound 1. The Mitsunobu reaction transformed the hydroxyl groups smoothly into phthalimides in a reasonable yield (56.7%). In general, the subsequent hydrazinolysis of the phthalimide was carried out in an ethanol solution to generate amino moieties. Due to the poor solubility of compound 2 in ethanol, we chose THF as the solvent. The experimental results showed that compound 2 can readily be dissolved in THF and the hydrazinolysis went on in high yield (46.2%).

To a two-neck flask containing compound 2 (0.800 g, 1.36 mmol) and THF (20 mL) was added hydrazine hydrate (0.389 g, 6.80 mmol). The mixture was refluxed for 5 hours under nitrogen and was then cooled down to room temperature. The solvent was removed under vacuum and a red solid mixture was obtained. Ethanol (30 mL) was added to this solid, followed by the addition of concentrated hydrochloric acid (10 mL). After stirring for 15 minutes tinder nitrogen, the resulting mixture was filtered to remove the solid, and the filtrate was concentrated by rotovap. The resulting solid was dissolved in EtOH/H2O (40 mL, 2: 1) and the insoluble portion was removed. The clear solution was neutralized with 10% NaOH solution until the solution became basic (pH>10). The product was then extracted into ether (5×40) and the combined ether layer was dried with magnesium sulfate and then concentrated. The crude product was purified through a very short chromatographic column and further recrystallized from methanol/water to yield Monomer A as a dark-red plate crystal with a melting point of 164°-165 ° C.

EXAMPLE 2

Preparation of NLO Polyimide Polymer

The poly(amic acid)s from the aromatic dianhydrides with aromatic diamines or alicyclic diamines were generally synthesized in aprotic solvents at room temperature. The polycondensaton reaction between aliphatic diamines and aromatic di(acid anhydride)s was reported to occur only at high temperatures under high pressure. However, our reaction went on smoothly at room temperature. Reasonable molecular weight was obtained as evidenced by the intrinsic viscosity measurements (0.4 dl/g).

Polyamic acid: To a 25-mL two-neck round bottom flask were added Monomer B (0. 1610 g, 0.74 mmol) and DMF (2 mL). The solution was stirred for 15 minutes at 0° C. and then a solution of Monomer A (0.2407 g, 0.74 mmol) in DMF (1 mL) was added slowly with vigorous stirring at 0° C. The resulting mixture was stirred at 0° C. for 3 hours and at room temperature for another 12 hours. The resulting polymer solution was used to prepare films directly without separation. Optical quality films were obtained by spin coating. To further characterize the polymers, the polyamic acid was precipitated into methanol and the polymer was collected by filtration. After washing with methanol for one day in a Soxhlet extractor, the polymer was collected as a dark red solid.

Polyimide: The polyamic acid film was dried at 50° C., then heated at 100° C. for 1 hour, 180° C. for 2 hours and, 200° C. for 5 hours+. The imidizaton process was monitored by Fourier Transform Infrared Spectroscopy (FTIR), ultraviolet/visible spectroscopy (UV/VIS), differential scamping calorimetry (DSC) and thermogravimetric analysis (TGA) measurements.

EXAMPLE 3

Characterization of Intermediates and Precursors $^1$H NMR spectra were collected on a Varian 500 MHz FT NMR spectrometer. The FTIR spectra were recorded on a Nicolet 20 SXB FTIR spectrometer. A Perkin-Elmer Lambda 6 UV/VIS spectrophotometer was used to record the UV/VIS spectra. Thermal analyses were performed by using the DSC-10 and TGA-50 systems from TA Instruments under a nitrogen atmosphere.

Characterization of compound 2 can be summarized as follows: melting point, 227°-228° C.; $^1$H NMR spectra (CDCl$_3$), δ, in ppm: 3.68 (triplet, J=7.03 Hz, H1, 4H), 3.89 (triplet, J=6.9 Hz, H2, 4 H), 6.79 (doublet, J=16.2 Hz, H3, 1H), 6.89 (doublet, J=8.4 Hz, H4, 2 H), 7.04 (doublet, J=16.2 Hz, H5, 1H), 7.30 (doublet, J=8.4 Hz, H6, 2 H), 7.49 (doublet, J=8.5 Hz, H7, 2 H), 7.65 (multiplet, H8, 4 H), 7.78 (multiplet, H9, 4 H), 8.13 (doublet, J=8.4 Hz, H10, 2 H).

Characterization data for the novel chromophore of the present invention (Monomer A) can be summarized as follows: melting point, 164°-165° C. $^1$H NMR (CDCl$_3$) δ, in ppm: 1.42 (singlet, H1, 4 H), 2.94 (triplet, J=6.7 Hz, H2, 4 H), 3.46 (triplet, J=6.7 Hz, H3, 4 H), 6.71 (doublet, J=8.6 Hz, H4, 2 H), 6.87 (doublet, J=16.2 Hz, H5, 1 H), 7.15 (doublet, J=16.2 Hz, H6, 1 H), 7.37 (doublet, J =8.6 Hz, H7, 2 H), 7.51 (doublet, J=8.6 Hz, H8, 2 H), 8.13 (doublet, J=8.6 Hz, H9,2H).

Figure 2:
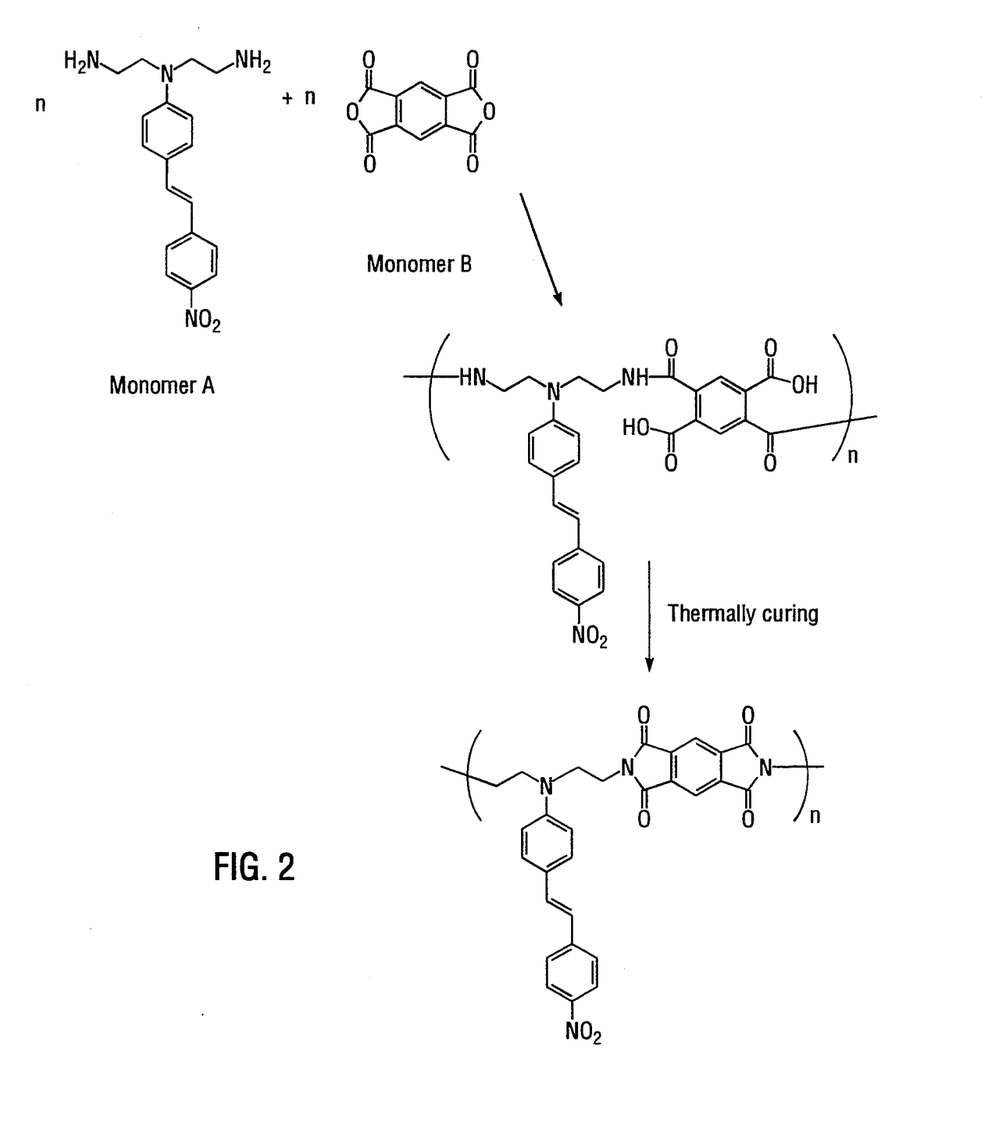
FIG. 2: Reaction scheme for the synthesis of the NLO polyimide polymer of the present invention.
Figure 3A:
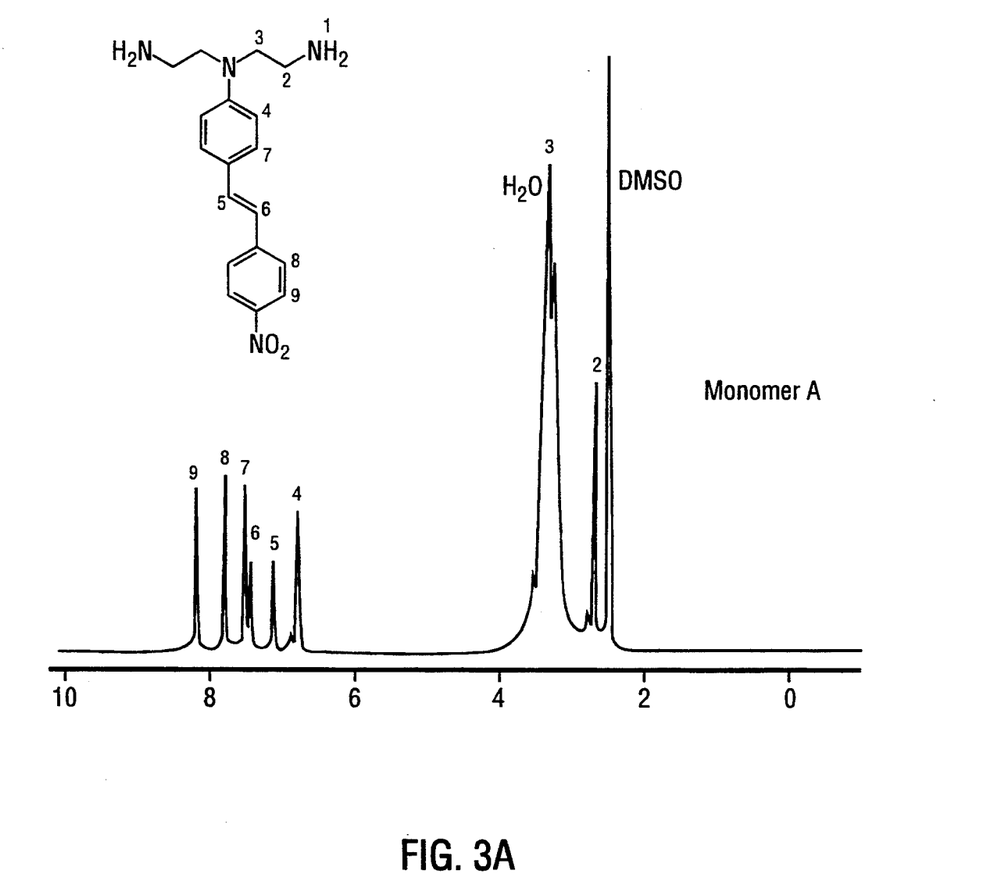
Figure 3B:
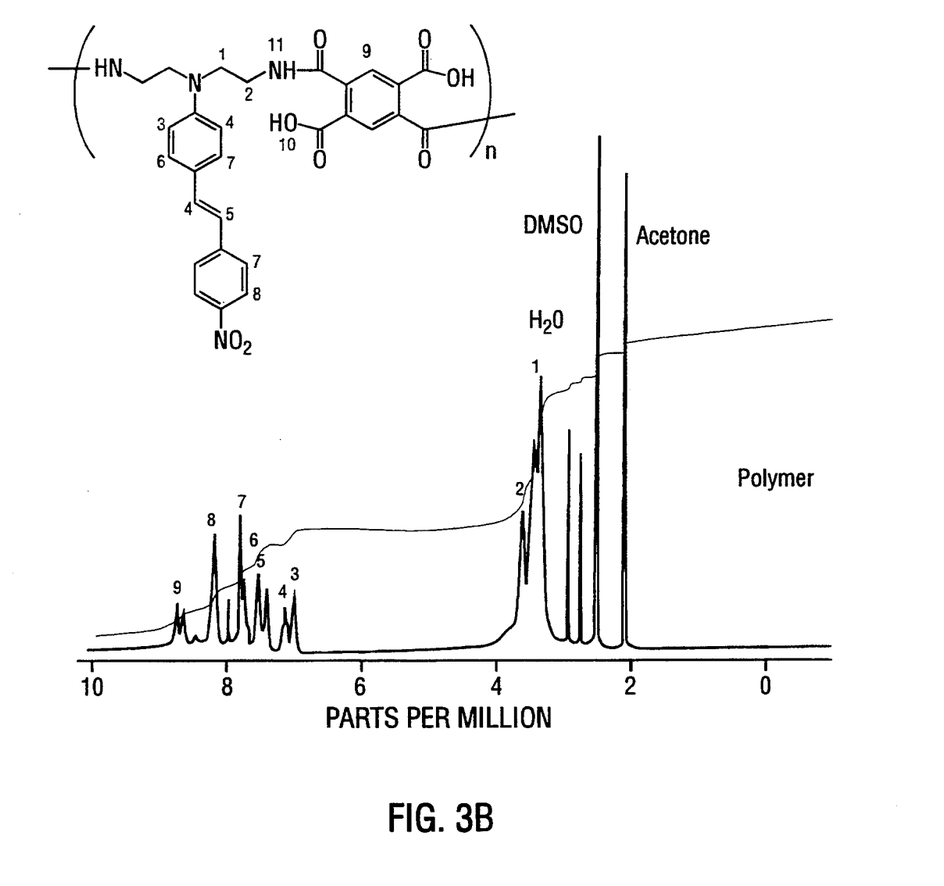

The structure of the polyamic acid was confirmed by spectroscopic studies. The $^1$H NMR spectrum of polyamic acid showed in change of —CH$_2$— proton chemical shift. (See FIG. 3) The chemical shift of the methylene group linked with primary amine was changed from 2.75 ppm to 3.6 ppm after the formation of amide, while the other methylene linked with tertiary amine was changed only from 3.2 to 3.4. The chemical shifts due to the stilbene unit were identical with those in the monomer except that the chemical shift due to proton 4 was shifted slightly (from 6.7 to 6.9 ppm, see the numbering of protons in FIG. 2). Two peaks at 8.55 and 8.70 ppm are evident due to the aromatic protons in the anhydride monomers, which indicated that the polyamic acid contains mainly meta amide linkage which leads to two non-equivalent protons.

Figure 4A:
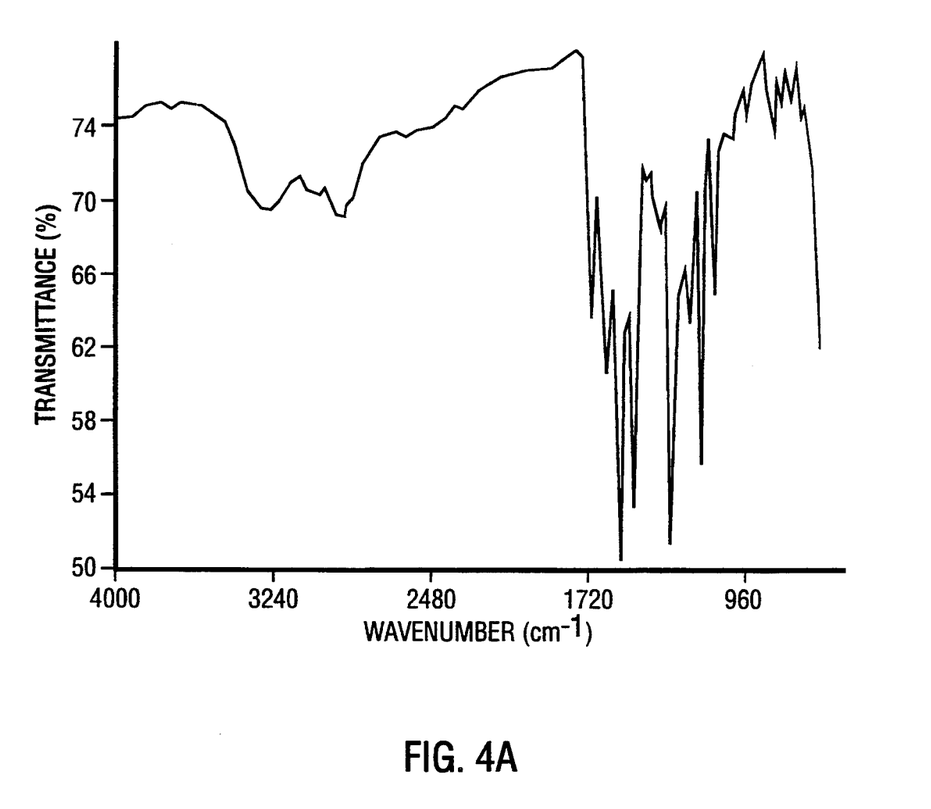
Figure 4B:
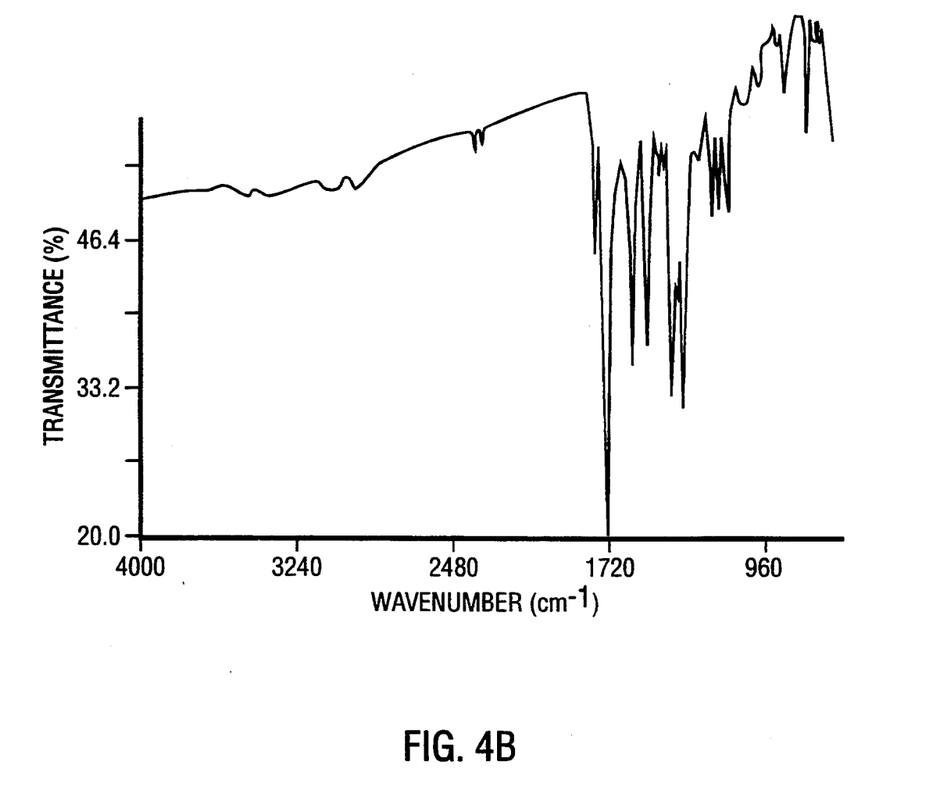

The FTIR spectrum of the polyamic acid showed clearly the bands due to carbonyl group in the amide linkage at 1719 cm$^{-1}$ and in carboxylic acid at 1651 cm$^{-1}$ (see FIG. 4). Two strong absorption bands due to nitro group in the NLO chromophore appear at 1337 and 1516 cm$^{-1}$ respectively. These results were consistent with the structure as proposed. After thermal curing (FIG. 4, lower panel), dramatic changes appeared in the FTIR spectra. New bands at 1772 (carbonyl asymmetric stretching), 1382, 1150 and 726 cm$^{-1}$ appeared, typical of the changes accompanying the imidization process. The band at 1650 cm$^{-1}$ completely disappeared after the polymer film was cured at 200° C. overnight. However, the bands due to the nitro group on the NLO chromophore did not change appreciably in intensity, indicating that the NLO chromophore survived during curing process. These results are consistent with those observed by TGA, DSC and UV/Vis studies.

EXAMPLE 4

Characterization of NLO Polyimide Polymer

Figure 5A:
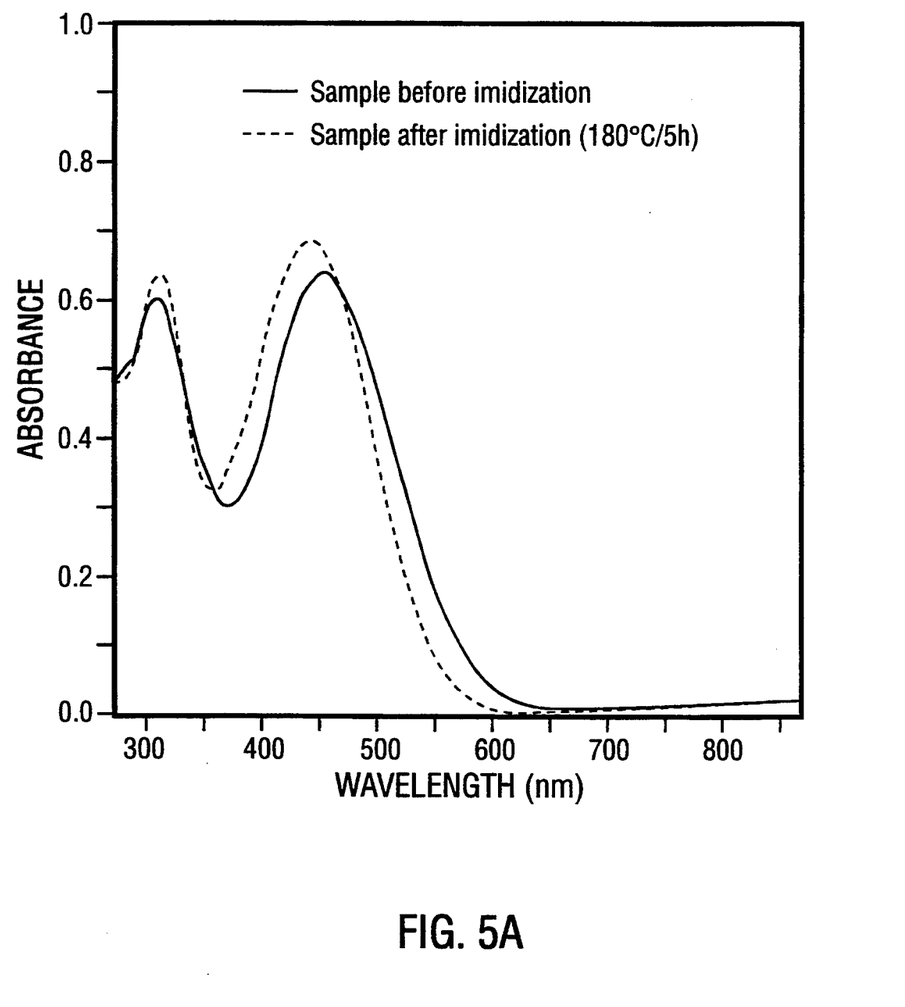
Figure 5B:
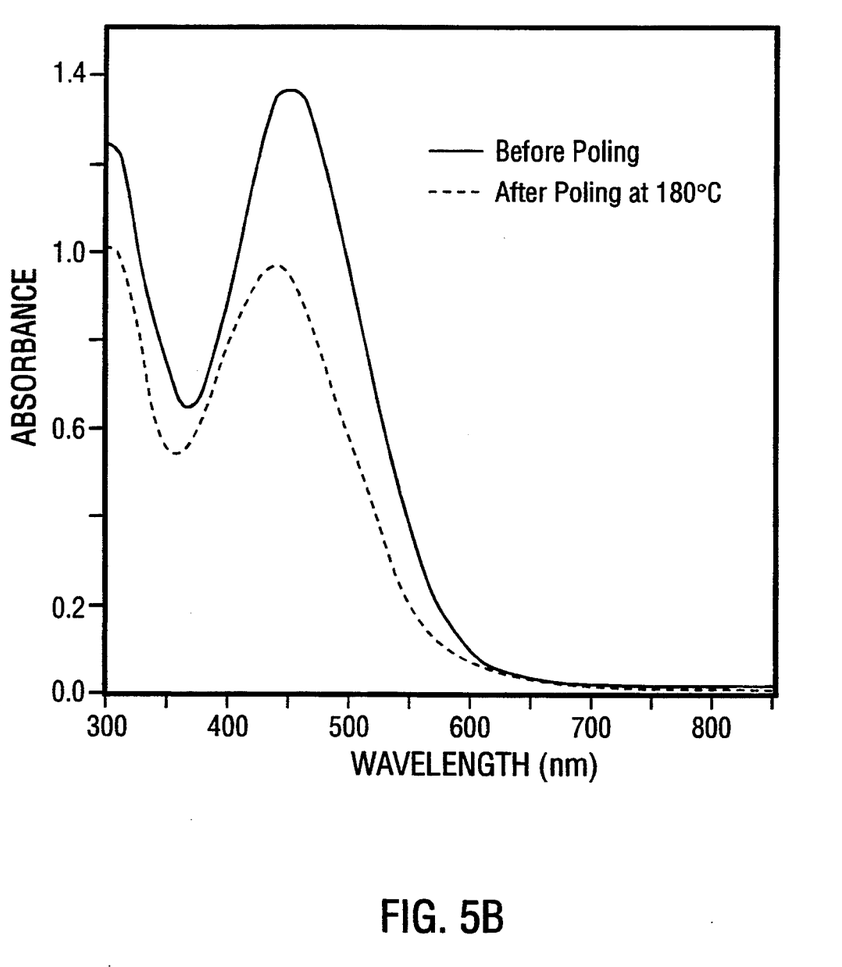

The UV/Vis spectra of both polyamic acid and polyimide exhibited a typical absorption pattern due to the amino-nitrostilbene NLO chromophore with an absorption maximum at about 450 nm (see FIG. 5). Samples without poling displayed a very small effect before and after imidization at about 200° C. (see FIG. 5, lower panel). However, after poling, the dipole moment of the NLO chromophore was aligned, and birefingence was introduced. The UV/Vis spectrum of the polyimide exhibited a decrease in absorption from which the order parameter of the poled film can be estimated. Under conditions of a 5 kV poling field at 180° C., an order parameter value of 0.30 was deduced.

Figure 6A:
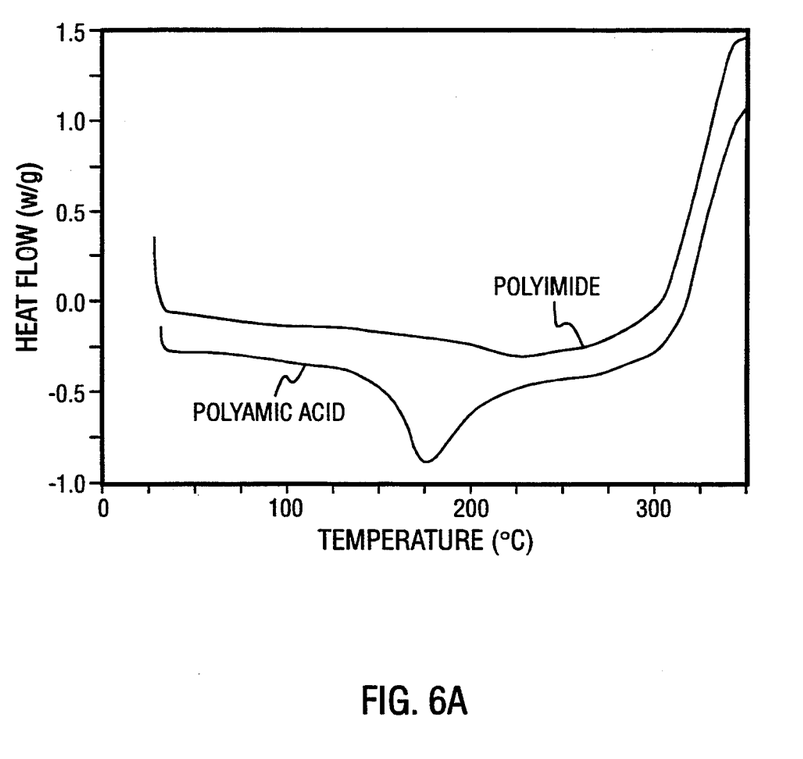
Figure 6B:
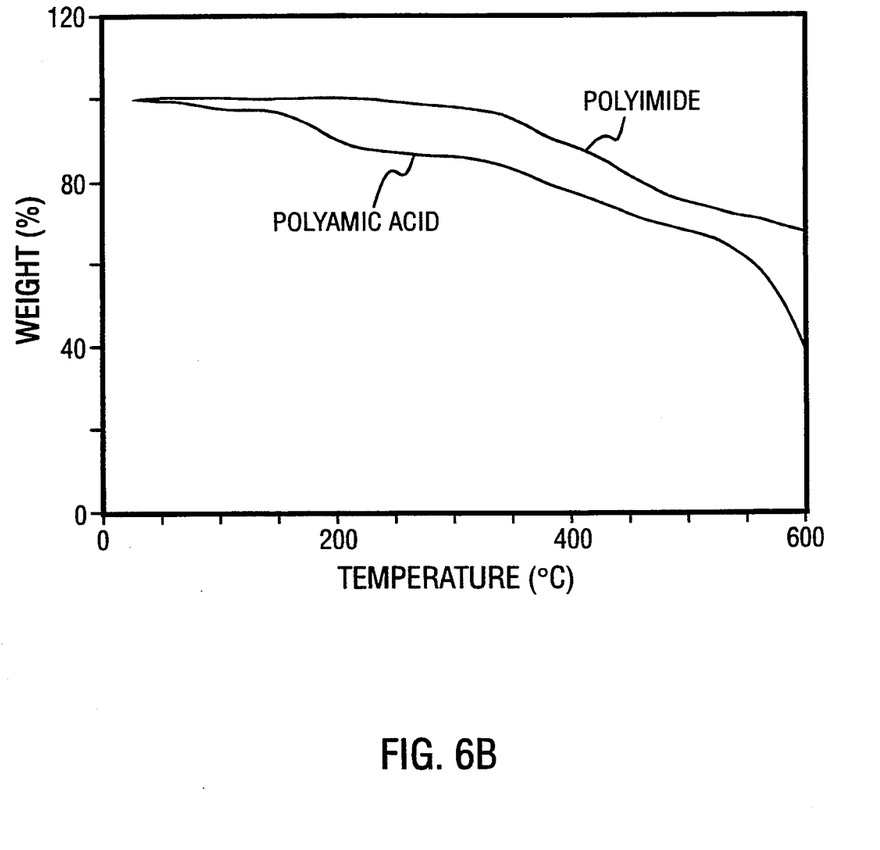

The polyimide was thermally stable up to 350° C. under a nitrogen atmosphere, while the polyamic acid started to lose weight at about 150° C. due to imidization. The imidization process was completed as the temperature reached 210° C., as shown both in TGA and DSC traces (FIG. 6). This indicated that to imidize the sample, the curing temperature can be set at about 200° C. under nitrogen without risk of damaging the materials. After imidization, the polyimide exhibited a glass transition temperature of 230° C.

Refractive indices of the polyimide were measured by using an ellipsometer at several wavelengths. The results were used to fit the Sellmyer equation to obtain the refractive indices at 532 and 1064 nm. Table I lists the results, along with other physical properties of the polyimide.

TABLE I

| | Physical properties of the polyimide | | | | |
|---|---|---|---|---|---|
| | $\lambda_{max}$ (nm) | order parameter | n (532 nm) | n (1064 nm) | $d_{33}$ (532 nm, pm/V) | $d_{33}$ (o, pm/V) |
| Polyimide | 450 | 0.30 | 1.833 | 1.746 | 115 | 27 |

Second harmonic generation measurements were performed at a wavelength of 1064 nm. As expected for nitrodialkylaminosfilbene, a very large $d_{33}$ value, 115 pm/V, was obtained. Since the second harmonic wavelength was at 532 nm, which is in the absorptive region of the polymer, there is a large resonant contribution to this $d_{33}$ value. It is known that for device applications, a large non-resonant value is important. Since we do not have a longer wavelength laser source, we evaluated the non-resonant value of this material by using an approximate, two level model. It was found that the disperseless $d_{33}$ value of the polyimide was approximately 27 pm/V (see Table I).

It has been realized that a promising utility for second order NLO polymers is in the fabrication of waveguides onto semiconductor integrated circuits. Some of the processes require high temperature, which further requires a second order polymer to withstand a high temperature environment during fabrication processes. To evaluate the high temperature stability of our polymers, we studied the temporal stability of second harmonic generation (SHG) signal. Enhanced stability may be determined by observing the decay of the NLO capabilities as a function of time at room temperature. However, this determination may be very time consuming. A more straight forward approach to determining stability is to observe the NLO signal at room temperature after exposure to elevated temperatures for periods of time necessary to allow relaxation of the NLO effect. It has been found that the relaxation of the NLO effect is very rapid and the level is dependent on the temperature. The higher the temperature before relaxation of the NLO effect the more stable the polymer will be at room temperature. It is possible to calculate an activation energy for the relaxation of a particular NLO polymer. Another measure of the stability of a polymer's NLO effect is the ability to retain a certain percentage of its original NLO activity after exposure to an elevated temperature.

Figure 7:
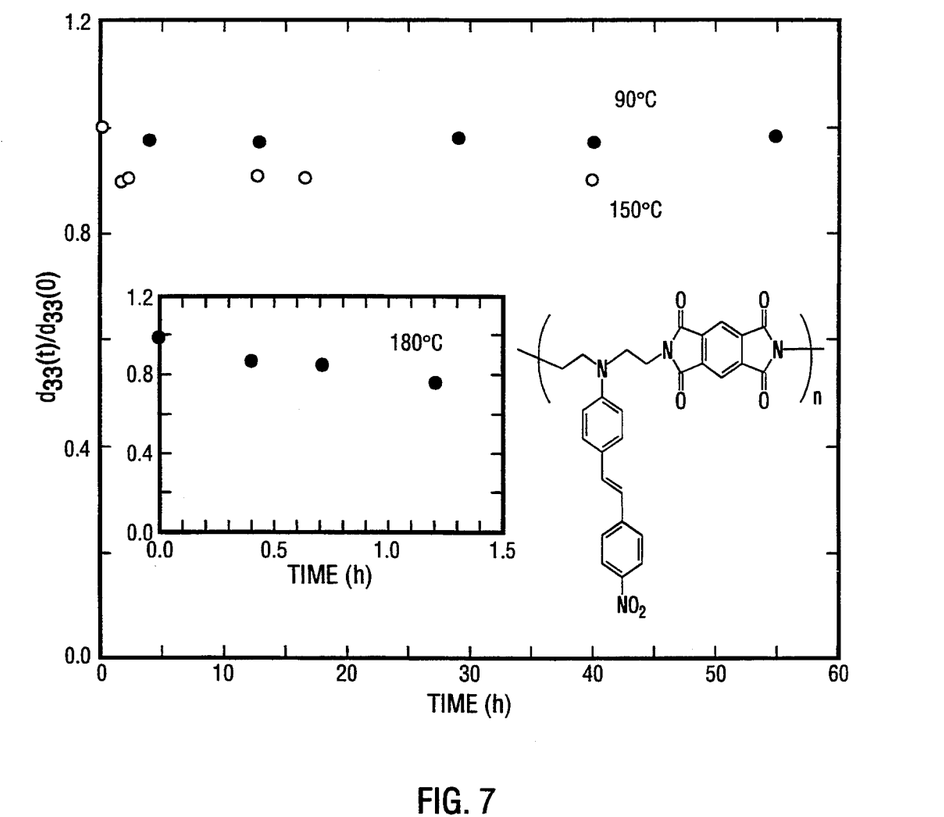
FIG. 7: SHG analysis of the polymers of the present invention.

It was found that the SHG signal exhibited no decay at room temperature, and at 90° C. (see FIG. 7). When the SHG signal of the polymer film was monitored at 150° C., an initial decay (15%) was observed and the signal was then stabilized at approximately 85% of its initial value. We further studied the stability at 180° C., observing that the decay was speeded up due to faster relaxation of the dipole orientation. However, the SHG signal was clearly stable enough to withstand such a high temperature environment for a reasonably long time; after almost one and a half hours, about 70% of the SHG signal was retained. From these results, we can see that this material is very promising for practical applications: it's nonlinearity can be stabilized at 90° C. for long time. The film can withstand a short period of high processing temperatures.

REFERENCES CITED

The references listed below as well as all references cited in the specification are incorporated herein by reference to the extent that they supplement, explain, provide a background for or teach methodology, techniques and/or compositions employed herein.

Becker et al., Chem. of Mater. (in Press).
Chemla and Zyss, Nonlinear optical properties of organic molecules and crystals, Academic Press, New York, (1987).
Chen et al., Macromolecules, 24:5421 (1991).
Chen et al., Proc. SPIE 1409,202, (1991).
Eich et al., J. Appl. Phys., 66:3241 (1989).
Hunsperger, Integrated Optics: Theory and Technology, 2/e, Springer-Verlag, New York, 1985.
Lin et al., Chem Mater. 4:1148 (1991).
Mandal et al., Appl. Phys. Lett., 58:2459 (1991).
Marder et al., ACS Symposium Series, (1991).
Nishihara et al., Optical Integrated Circuits, McGraw-Hill Book Company, New York, 1985
Park et al., Chem. of Mater., 2:229 (1990).
Prasad and Williams, Introduction to nonlinear optical effects in molecules and polymers, J. Wiley and Sons, New York, 1991.
Ranon et al., Appl. Phys. Lett. 62:2605 (1993).
Shi et al., Appl. Phys. Lett. 58:1131 (1991).
Singer et al., Appl. Phys. Lett. 49:248 (1986).
Williams, Angew. Chem., Int. Ed. (Engl.) 23:690 (1984).
Williams, ed., Nonlinear Optical Properties of Organic and Polymeric Materials, ACS Symposium Series No. 233, American Chemical Society, Washington, D.C., 1983.
Wu et al., Appl. Phys. Lett., 58:225 (1991).
Yu et al., Macromolecules, 25:5609 (1992).

What is claimed is:

1. A polyimide polymer exhibiting second order, nonlinear optical properties, further characterized by high-temperature stability, wherein said polymer is prepared via a polycondensation reaction between 1,2,4,5-benzenetetracarboxylic dianhydride and nitro(N,N-diethylamino)stilbene to form a polyamic acid intermediate and curing the polyamic acid intermediate within an electric field pole or corona pole under conditions sufficient to form said polymer.

2. The polymer of claim 1, wherein the high-temperature stability is retained at temperatures in the range of 150° to 180° C.

3. The polymer of claim 2, wherein the high temperature stability is indicated by retention of at least 70% of a second harmonic generation signal.

4. The polymer of claim 1 wherein said polyamic acid intermediate is cured by heating the intermediate above its glass transition temperature ($T_g$) for between about 1 and about 24 hours and subsequently cooling the product to room temperature.

5. The polymer of claim 4 wherein said glass transition temperature is approximately 180° C.

6. The polymer of claim 1 wherein said electric field is applied in a strength between about 0.05 to about 1.5 megavolts per centimeter (MV/cm).

7. A polyimide polymer having the general structure:

* * * * *